Dec. 17, 1940.  G. W. KILLIN, JR  2,225,304
BICYCLE
Filed Jan. 31, 1940
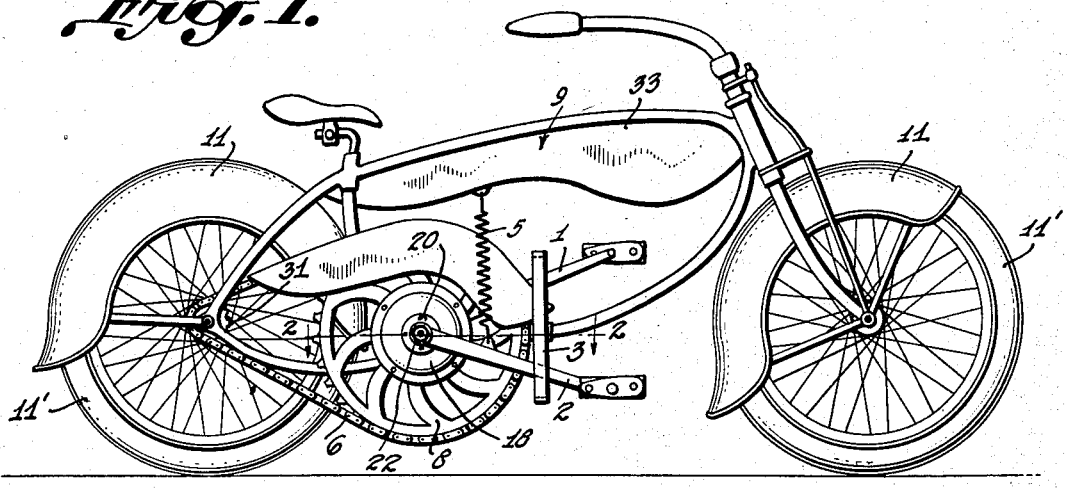
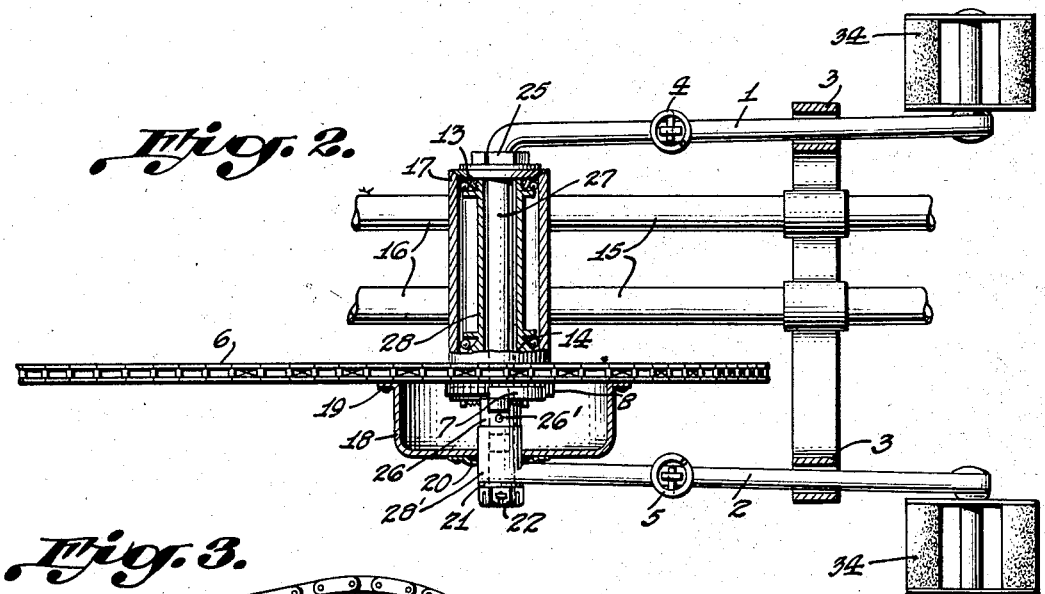
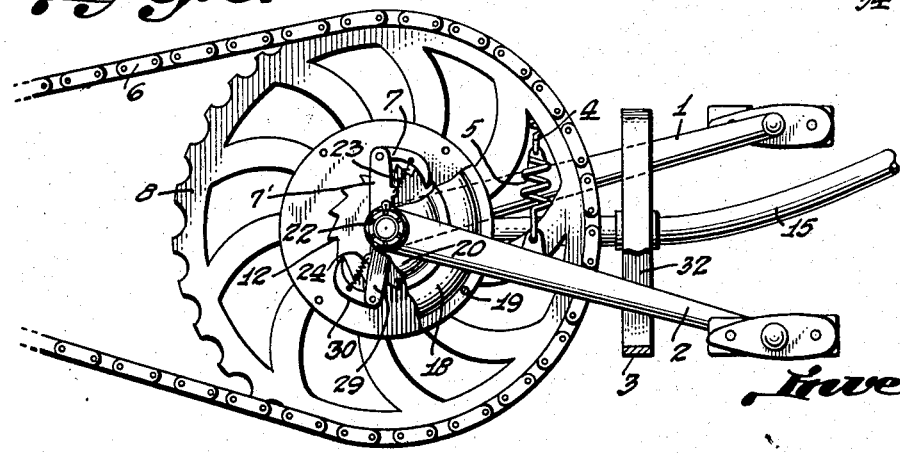
Inventor:
George Washington Killin, Jnr., Patented Dec. 17, 1940

2,225,304

UNITED STATES PATENT OFFICE 2,225,304

BICYCLE

George Washington Killin, Jr., West Huntington, W. Va.

Application January 31, 1940, Serial No. 316,594

6 Claims. (Cl. 280—258)

This invention relates generally to improvements in wheeled vehicles and pertains particularly to an improved bicycle.

A primary object of the present invention is to provide a bicycle having pedal operating or driving means wherein the said operating pedals are constructed and arranged in such a manner as to enable the rider of the vehicle to propel the same by an up and down movement of the feet instead of requiring the movement of the feet along circular paths as is the case in the operation of bicycles of the well known conventional design.

Another object of the invention is to provide an improved bicycle wherein the operating pedals are moved up and down in substantially vertical paths and wherein a novel construction is provided for transmitting power from the pedals to a sprocket gear through the medium of a single driving shaft.

Still another object of the invention is to provide a bicycle structure having a pair of pedals supported upon a driving axle and extending forwardly therefrom and having a novel ratchet and pawl connection between the pedals and a driving sprocket which facilitates the transmission of operating power to the rear wheel of the vehicle.

A further object of the invention is to provide in a bicycle structure of the character stated, a novel means for housing or enclosing the ratchet and pawl mechanism whereby such mechanism may be kept immersed in oil or grease, the means for retaining the oil and grease around such mechanism rotating with the mechanism and with the driving sprocket wheel.

Further objects and advantages of the invention will become apparent as the description of the same proceeds and the invention will be best understood from a consideration of the following detailed description taken in connection with the accompanying drawing wherein—

Figure 1 is a view in side elevation of the bicycle structure showing the operating mechanism therefor which constitutes the present invention.

Figure 2 is a horizontal partial sectional view taken substantially on the line 2—2 of Figure 1.

Figure 3 is a view in side elevation upon an enlarged scale of the driving sprocket wheel and the ratchet mechanism coupling the pedals thereto, a portion of the structure being broken away.

Referring now more particularly to the drawing, the numeral 9 generally designates the frame structure of the bicycle, the front and rear mud guards therefor being indicated by the numeral 11 and covering the usual front and rear wheels 11'.

The numerals 15 and 16, respectively, designate double front and rear lower bars which form a part of the frame structure, these bars being coupled together at their adjacent ends by an interposed transversely directed cylindrical housing 17.

Extending axially through this housing 17 is a driving axle 27 which, at the left side of the vehicle, is connected integrally with the forwardly extending pedal lever 1. Surrounding the axle 27 within the housing 17 is a bearing sleeve 28 which at its ends cooperates with the bearing cones 13 and 14 to rotatably support the axle. Upon the outer end of the axle is a nut 25 which bears against the left bearing cone 13, this nut being screwed on to the axle and functioning to maintain the same against axial movement.

Upon the right side of the vehicle there is mounted a large driving sprocket wheel 8 which is mounted upon the axle to turn freely thereon. This sprocket wheel turns against the adjacent end of the axle housing 17 and secured to the sprocket wheel upon the opposite side from the housing 17 is a ratchet gear 12 which turns with the sprocket wheel.

Mounted upon the axle 27 upon the outer side of the ratchet gear is a collar 26 which is secured to the axle by a pin or bolt 26'. This collar maintains the sprocket wheel and ratchet gear in position against the end of the housing 17 and prevents axial movement of these elements on the axle. The collar 26 carries an upstanding finger 7' upon the upper end of which is pivotally mounted a pawl 7. This pawl extends forwardly over the top of the ratchet gear for engagement with the teeth thereof and this pawl is shifted together with the supporting collar 26 when the axle 27 is rocked by movement of the pedal lever 1 to impart rotary movement to the ratchet gear and the sprocket wheel attached thereto. A spring 23 connects the pawl 7 with the supporting finger 7' and normally draws the pawl into engagement with the ratchet wheel.

As is clearly shown in Figure 2, the axle 27 extends a substantial distance beyond the collar 26 and this extended end of the axle has oscillatably mounted thereon a sleeve 28' with which is integrally connected the right hand pedal lever 2. This pedal lever sleeve is held in position against axial movement on the axle by the castellated nut 22 which is threaded upon the end of the axle. A suitable washer or other friction reducing means 21 is inserted between the castellated nut and the end of the pedal lever sleeve.

The pedal lever sleeve 28' carries a downwardly extending finger 29 upon the end of which is pivotally supported the pawl 30. This pawl is directed oppositely to the pawl 7 and a pull spring 24 connects the pawl 30 with the adjacent supporting finger 29, as shown in Figure 3, so as to normally maintain contact between the pawl and the ratchet wheel or gear.

It will be seen from the foregoing that when the pedal levers 1 and 2, both of which extend forwardly with respect to the axle 27, are working up and down by a rider on the vehicle the pawls 7 and 30 will be actuated with respect to the ratchet gear to alternately impart rotary thrust thereto so as to effect the transmission of clockwise rotation to the sprocket wheel.

Operatively coupled with the rear wheel of the vehicle is a driven sprocket wheel 31 and this sprocket wheel is connected with the large or main driving wheel 8 by the sprocket chain 6.

The numeral 18 designates a housing or casing which encloses the sprocket gear and the driving pawls and adjacent parts of the axle. This casing is secured by means of fastening elements 19 to the sprocket wheel 8 concentric with the wheel. The inner side of the casing adjacent the wheel is, of course, suitably closed and the outer side wall is provided with a central opening through which the pedal lever sleeve 28' extends. Secured to the casing and encircling the sleeve 28' is a felt gasket which has a wiping contact with the sleeve and functions to prevent grease or lubricant, with which the casing may be filled, from escaping, thus the pawls and the ratchet gear may be kept completely immersed in lubricant and, in addition to preventing wear this will protect the moving parts against dirt and grit which, if they were not covered by the casing, would enter between the moving surfaces of such parts and cause rapid wear.

Supported upon the pair of frame bars 15 is a transversely extending bracket unit 32 and this bracket unit supports at the two sides of the vehicle the vertical guide frames 3 through one of which the pedal lever 1 extends while the pedal lever 2 extends through the other frame. These frames limit the vertical movement of the levers and while the downward movement of the levers is effected by pressure of the feet of the rider of the vehicle, the upward movement of the levers is brought about by the provision of the contractile springs 4 and 5 which are connected, respectively, with the levers 1 and 2 and with the dummy tank 33 which is secured to the top part of the frame, as shown in Figure 1.

The operation of the bicycle will, it is believed be readily apparent from the foregoing. When a rider of the vehicle forces the pedals 34 downwardly, the lever 1 will turn the shaft 27 to move the pawl 7 independently of the operation of the lever 2 and when this latter lever is actuated downwardly the pawl 30 with which it is connected will engage a tooth of the ratchet gear and impart turning movement thereto in cooperation with the pawl 7. The sleeve 28' which is connected with the lever 2 will turn upon the axle freely and independently of any turning movement which is imparted to the axle by the lever 1. By this arrangement the levers can be worked up and down alternately or both can be forced down at the same time and allowed to move upwardly at the same time or any other sequence of operation between the levers may be established or one lever only may be actuated to effect the turning of the ratchet gear and sprocket wheel while the other lever remains stationary.

From the foregoing it will be readily seen that there has been provided a bicycle structure in which a minimum number of movable parts is employed and in which the construction and arrangement of the parts is such that the operation of the vehicle may be accomplished with a minimum expenditure of energy. Due to the relatively long levers which may be employed for supporting the pedals, indicated by the numeral 34, a great leverage can be obtained so that the transmission of desired power to the sprocket wheel and to the rear wheel of the vehicle may be accomplished without a great deal of effort.

I claim:

1. In a bicycle of the character stated, a frame having front and rear supporting wheels, an axle extending transversely of the frame and supported thereon for turning, a ratchet gear mounted on the axle for free rotation thereabout, a driving connection between said gear and one of said wheels, a pedal lever rigidly coupled with said axle, a pawl coupled with said axle to be turned thereby and having operative connection with the gear, a second pedal lever supported for oscillation on the axis of and independently of the axle, a pawl operatively connected with said second lever and having operative engagement with the gear, said levers having a raised inoperative positon and said pawls functioning upon the depression of the levers to impart rotary movement to the gear.

2. In a bicycle of the character stated, a frame having front and rear supporting wheels, an axle extending transversely of the frame and supported thereon for turning movement, said axle having a forwardly extending continuation at one end forming a pedal lever, a ratchet gear mounted upon the axle for free turning movement thereabout, a second pedal lever having a sleeve at one end which receives the axle adjacent its other end to facilitate free oscillation of the second lever about the axle as a center, a finger carried by the axle adjacent the gear and extending radially from the axle, a pawl pivotally connected with said finger and having operative engagement with the gear, a finger secured to said sleeve and extending radially therefrom, a pawl pivotally attached to the last mentioned finger and having operative connection with the gear, a driving connection between the gear and one of said wheels, and means normally urging said levers to an upwardly and forwardly extending position, the levers when forced downwardly against said last means effecting the turning of the gear through said pawls.

3. In a bicycle of the character stated, a frame having front and rear supporting wheels, an axle extending transversely of the frame and supported thereon for turning movement, a ratchet gear mounted upon the axle at one side of the frame, for free turning movement around the axle, a pedal lever rigidly coupled with the axle upon the side of the frame opposite from the gear, an operative driving connection between the gear and a wheel of the bicycle, a second pedal lever, a sleeve carried by the second lever and having said axle extended therethrough, said sleeve being in close proximity to the gear, a pawl coupled with said axle and having operative connection with the gear, a pawl coupled with said sleeve and having operative connection with said gear, said pedal levers extending forwardly from the axle, and resilient means normally urging said levers upwardly to a predetermined inoperative position.

4. In a bicycle of the character stated, a frame having front and rear supporting wheels, an axle extending transversely of the frame and supported thereon for turning movement, a ratchet gear mounted upon the axle at one side of the frame, for free turning movement around the axle, a pedal lever rigidly coupled with the axle upon the side of the frame opposite from the gear, an operative driving connection between the gear and a wheel of the bicycle, a second pedal lever, a sleeve carried by the second lever and having said axle extended therethrough, said sleeve being in close proximity to the gear, a pawl coupled with said axle and having operative connection with the gear, a pawl coupled with said sleeve and having operative connection with said gear, said panel levers extending forwardly from the axle, resilient means normally urging said levers upwardly to a predetermined inoperative position, and a housing enclosing said pawls and gear and having the axle extending therethrough for the protection of the pawls and gear and for maintaining lubricant in contact therewith.

5. In a bicycle of the character stated, a frame having front and rear supporting wheels, a tubular housing supported upon the frame and extending transversely of the same, an axle extending through the housing and rotatably supported therein, a pedal lever connected with one end of the axle and extending forwardly therefrom and from the housing, a sprocket wheel disposed adjacent the other end of the housing and mounted on the axle for free rotation thereabout, a ratchet gear concentric with and secured to the sprocket wheel, a finger secured to the axle adjacent the gear and extending radially of the axle, a pawl pivotally attached to the finger and engaging said gear, a second pedal lever, a sleeve carried by the second lever and having the axle extending therethrough, the sleeve being disposed on the side of the gear remote from the first lever and being freely oscillatable on the axle, a finger carried by the sleeve, a pawl pivotally attached to the finger and having operative connection with the gear, and resilient means normally urging said levers upwardly to a predetermined raised position.

6. In a bicycle of the character stated, a frame having front and rear supporting wheels, a tubular housing supported upon the frame and extending transversely of the same, an axle extending through the housing and rotatably supported therein, a pedal lever connected with one end of the axle and extending forwardly therefrom and from the housing, a sprocket wheel disposed adjacent the other end of the housing and mounted on the axle for free rotation thereabout, a ratchet gear concentric with and secured to the sprocket wheel, a finger secured to the axle adjacent the gear and extending radially of the axle, a pawl pivotally attached to the finger and engaging said gear, a second pedal lever, a sleeve carried by the second lever and having the axle extending therethrough, the sleeve being disposed on the side of the gear remote from the first lever and being freely oscillatable on the axle, a finger carried by the sleeve, a pawl pivotally attached to the finger and having operative connection with the gear, resilient means normally urging said levers upwardly to a predetermined raised position, a bracket secured to the frame and extending transversely thereof in a position forwardly from said casing, and a pair of vertically arranged guide frames carried by the bracket at each side of the first frame and having a pedal lever extended therethrough, said guide frames limiting the upward and downward movements of the levers.

GEORGE WASHINGTON KILLIN, JR.